United States Patent
Oberbeck (10) Patent No.: US 6,722,630 B2
(45) Date of Patent: Apr. 20, 2004

(54) SHUT-OFF DEVICE WITH A SWIVELLABLE BUTTERFLY VALVE AND AN ENTROPY-ELASTIC ANNULAR SEAL HELD ON A BACKUP RING

(75) Inventor: Gerhard Oberbeck, Havixbeck (DE)

(73) Assignee: Warex Valve GmbH (DE)

( * ) Notice: Subject to any disclaimer, the term of this patent is extended or adjusted under 35 U.S.C. 154(b) by 212 days.

(21) Appl. No.: 09/994,101

(22) Filed: Nov. 26, 2001

(65) Prior Publication Data

US 2002/0130290 A1 Sep. 19, 2002

(30) Foreign Application Priority Data

Dec. 2, 2000 (DE) .......................................... 100 60 004

(51) Int. Cl.$^7$ ............................................... F16K 25/02
(52) U.S. Cl. ....................................................... 251/173
(58) Field of Search ......................................... 251/173

(56) References Cited

U.S. PATENT DOCUMENTS

| | | | |
|---|---|---|---|
| 1,844,641 A | | 2/1932 | Wein |
| 4,165,859 A | * | 8/1979 | Maciulaitis et al. ........ 251/173 |
| 4,176,675 A | * | 12/1979 | Liberman .................... 251/173 |
| 4,634,097 A | * | 1/1987 | Hubertson .................... 251/173 |
| 4,836,499 A | * | 6/1989 | Steele et al. ................. 251/173 |

FOREIGN PATENT DOCUMENTS

| | | | |
|---|---|---|---|
| DE | 1 500 181 | 10/1969 | |
| DE | 26 25 262 | 12/1977 | ............. F16K/3/10 |
| DE | 38 74 059 T2 | 3/1989 | ............. F16K/1/228 |
| DE | 91 06 289.6 | 11/1991 | ............. F16K/1/228 |
| DE | 195 42 568 A1 | 5/1997 | ............. F16K/1/226 |

* cited by examiner

Primary Examiner—Paul J. Hirsch
(74) Attorney, Agent, or Firm—Renner, Kenner, Greive, Bobak, Taylor & Weber (57) ABSTRACT

A shut-off device (1) includes a housing (2) and a butterfly valve (4). The butterfly valve (4) can be swivelled using a drive shaft (3). When the butterfly valve (4) is closed, the butterfly valve (4) is sealed off from the housing (2) and from the pipe connection by an annular seal (7). The annular seal (7) is held on a face (5) of the housing (2) by a backup ring (6). The annular seal (7) is attached to the backup ring (6) using two annular projections (11, 12). The two annular projections (11, 12), respectively, interface with annular grooves (13, 14) provided on the backup ring (6). A fluid pressure chamber (22) is formed between the backup ring (6) and the annular seal (7), and a fluid connection pipe (24) extends through the backup ring (6) into the fluid pressure chamber (22).

7 Claims, 8 Drawing Sheets

SHUT-OFF DEVICE WITH A SWIVELLABLE BUTTERFLY VALVE AND AN ENTROPY-ELASTIC ANNULAR SEAL HELD ON A BACKUP RING

The invention relates to a shut-off device comprising a single-part housing insertable in a pipeline, and a butterfly valve swivellable by a drive shaft wherein said butterfly valve in its closed position is sealed off from the housing and from the pipe connection, by a distensible entropy-elastic annular seal of U-shaped cross section to which fluid can be applied, with said annular seal being held by a backup ring on a face of the housing.

In a known shut-off valve of this type according to DE 195 42 568 C2 the exterior region of the backup ring which engages the U-shaped cross section of the interior region of the annular seal, is interspersed with drill holes for admitting self-sealing screws, and is removably attached by means of said screws and attached to the face in the set-off of the housing and at its area of the external circumference of the housing sealed off with an O-ring against the set-off in the pipe housing, so as to provide a fluid-proof seal. However, despite undeniable advantages of this shut-off device during various changes of the backup ring with the ring seal, it has been shown that the O-ring adheres very badly to the housing, by suction, on the area of the external circumference of the backup ring. This makes it considerably more difficult to remove the backup ring even after the self-sealing screws have been undone and removed. Furthermore, the expense of using the self-sealing screws turns out to be a disadvantage because even when only one screw is not tight, the fluid acting on the annular seal can escape outwards at that position.

Furthermore, DE-OS 15 000 181 discloses a shut-off device of the type mentioned above, which, due to the selection of the cross section and materials disclosed therein, provides a sealing ring which is extremely difficult to produce, because its external area is to be relatively rigid and inelastic, while the middle interior region which comprises a sealing surface, is to be relatively elastic. Overall, a complicated annular seal made from an entropy-elastic material, a rigid ring and a backup ring are disclosed for providing a seal in a single-part housing. There is no information on how to attach the backup ring. This can only mean that during installation in the single-part housing the backup ring is either pressed against the sealing ring by being fastened in the flange of the pipeline (which results in leakages) or said backup ring is mounted as a shrink ring in the housing. In any case, repairing a faulty sealing ring requires expert personnel who will need to know the entire design and the fluid-carrying pipes of this shut-off device. If such a shut-off device is used in a medium stream with abrasive particles or crystals, the entropy-elastic annular seal wears relatively quickly, and thus needs to be replaced with a new one. For this purpose, the entire shut-off device needs to be de-installed from the respective pipeline and returned to the manufacturer who then needs to remove the faulty annular seal and replace it with a new one. Such repair work is not only time consuming and costly, but also associated with a disadvantage in that a new shut-off device (kept in stock) will have to be placed in the pipeline if waiting for repair of the de-installed shut-off device and the associated downtime is to be avoided.

U.S. Pat. No. 1,844,641 discloses a non-generic shut-off device which comprises a two-part housing with ring flanges on each end, together with which, said housing is inserted in a pipeline. The two housing halves are mutually fastened via a ring with an entropy-elastic annular seal, using screws, and rigidly interconnected by straining screws and shrink rings, thus forming an annular internal set-off. Undoing such a multi-part housing kept together by straining bolts and shrink rings, as well as changing the ring with its entropy-elastic annular seal, can only be undertaken by expert personnel. For this reason, either the entire shut-off device has to be sent to the manufacturer for repair, with downtime extending until the repaired part has been returned, or a new shut-off device has to be used which again increases operating costs.

DE 38 74 059 T2 discloses a non-generic shut-off device which does not comprise a backup ring. Instead, its entropy-elastic annular seal with two facing projections encompasses the interior region of the housing so as to provide a seal, with a central drive shaft of the butterfly valve penetrating said housing. On both ends, said drive shaft must provide a fluid-proof seal not only against the medium flowing in the pipeline, but also against the fluid used for distending the entropy-elastic annular seal. Any exchange of this annular seal necessitates expert personnel because neither sealing the drive shaft after removal and re-insertion, nor removal and replacement of a faulty annular seal with a new seal, can be undertaken by general support staff. Therefore, this shut-off device too, has to be sent to the manufacturer for repair, with downtime extending correspondingly until the repaired part has been returned, or a new shut-off device has to be used which again increases operating costs.

Based on this state of the art, it is thus the object of the invention to provide a shut-off device of the type mentioned above, whose entropy-elastic annular seal, in the case of a leakage, can be repaired quickly and easily by removal together with the backup ring, without creating further sealing problems, thus significantly reducing downtime of the respective pipeline.

In conjunction with the generic notion mentioned in the introduction, according to the invention this object is met in that by means of two annular projections the annular seal engages one annular groove each in each face of the backup ring; in that each of the lateral external areas of said annular seal comprises an integrated projecting sealing ring, and in that the backup ring, in its area situated outside the annular seal, is attached to the housing by means of several conventional hexagon socket screws. The special design of the annular seal with the two facing projections, in conjunction with the projecting sealing rings, integrated into each of the lateral external areas of said annular seal, obviates the need for a set-off in the face of the respective housing. Instead, the backup ring can now be placed together with the annular seal on a plane face of the housing and can be connected with said housing, using conventional hexagon socket screws. Other countersinkable screws can be used as a substitute for such hexagon socket screws.

Because of the sealing rings integrated in the annular seal at the two lateral external areas, there is no longer any need for the hitherto necessary self-sealing screws for attaching the backup ring to the housing. This not only simplifies installation and deinstallation of the backup ring and the annular seal, but it also makes the procedure much faster. Moreover, there is no longer any fixation by suction of one of these annular seals, as is frequently the case with the use of the O-ring used according to the nearest state of the art.

According to a particularly advantageous improvement of the invention, the cross-sectional shape of the facing annular projections matches the cross-sectional shape of the accommodating annular grooves, and in that region, on the two lateral external areas, the projecting sealing rings are arranged. As a result of the excess of the two projecting sealing rings in relation to the lateral external areas, after tightening of the hexagon socket screws and thus of the backup ring at the housing as well as after inserting and tightening the shut-off device within a pipeline, these two sealing rings also press the two annular and facing projections of the annular seal into their annular grooves, thus providing an O-ring like seal. In this way, both an external seal against the fluid flowing through the pipeline, and an internal seal against the fluid distending the entropy-elastic annular seal, are achieved. To this purpose, it is advantageous if the sealing rings integrated in each of the lateral external areas comprise a cross section which is in the shape of a semicircle or a segment of a circle.

According to an advantageous improvement of the invention, the backup ring comprises a fluid pressure chamber at its internal circumferential area; said fluid pressure chamber being in the shape of an encompassing annular groove, with a fluid connection pipe, which is sealed so as to be fluid-proof towards the external atmosphere, directly leading into said annular groove so that pressure can be exerted on the annular seal. This fluid connection pipe comprises a conventional screw connection which for sealing purposes either comprises a sealing metal ring or an adhesive. Unlike the situation with the nearest state of the art according to DE 195 42 568 C2, the fluid connection pipe is not routed through the housing but instead directly from the area of the external circumference, radially into the backup ring. Thus this obviates the need to provide a seal with an O-ring, at the area of the external circumference of the backup ring, as has hitherto been the case. Each of the two annular projections of the annular seal, said projections facing each other, engages an annular groove at the face of the backup ring. Consequently, as a result of pressure being exerted onto these backup rings, by the projecting sealing rings, arranged at the lateral external areas, said sealing rings acting as O-rings, the entire pressure chamber space is simply and very effectively sealed off, for distension of the annular seal, so as to be fluid-proof both towards the external atmosphere and towards the interior of the pipeline.

To further simplify installation and deinstallation, the backup ring is placed on the matching face of the housing, and encompassed by centring turned grooves only in the two diametrically opposed regions of the lead-through of the shaft of the butterfly valve. These centring turned grooves cannot be done without because the lead-through for the shaft of the butterfly valve requires that from the two diametrically opposed regions the housing be widened correspondingly. Advantage of this widening is now also taken for centring the backup ring with its in-between regions in relation to the housing. After centring the backup ring, it can simply be directly attached to the housing, with the distensible annular seal, using conventional hexagon socket screws. There is no longer any need for all-round centring in the form of a pronounced set-off.

At its face pointing away from the annular seal, the housing is sealed off from the end of the pipeline, in a manner known per se, by an O-ring inserted in an annular groove.

To protect the entropy-elastic annular seal and thus to prolong its service life, the butterfly valve is swivelled into and out of its closed position without touching the annular seal. It is only after it has reached the closed position that the butterfly valve is distended, and it is depressurised before it is swivelled out of its closed position. In this way, during the closing procedure with the butterfly valve, the annular seal moves into its closed position without establishing contact and thus with low friction, because the application of pressure to the annular seal occurs only after this. Likewise, the butterfly valve is opened only when the annular seal is without pressure. In both cases, there is a small circumferential clearance between the area of the external circumference of the ring seal and the area of the external circumference of the butterfly valve, both during and after the sealing process.

The drawings show one embodiment of the invention, as follows:

FIG. 5 an enlarged view of section V of FIG. 3a;

Figure 1:
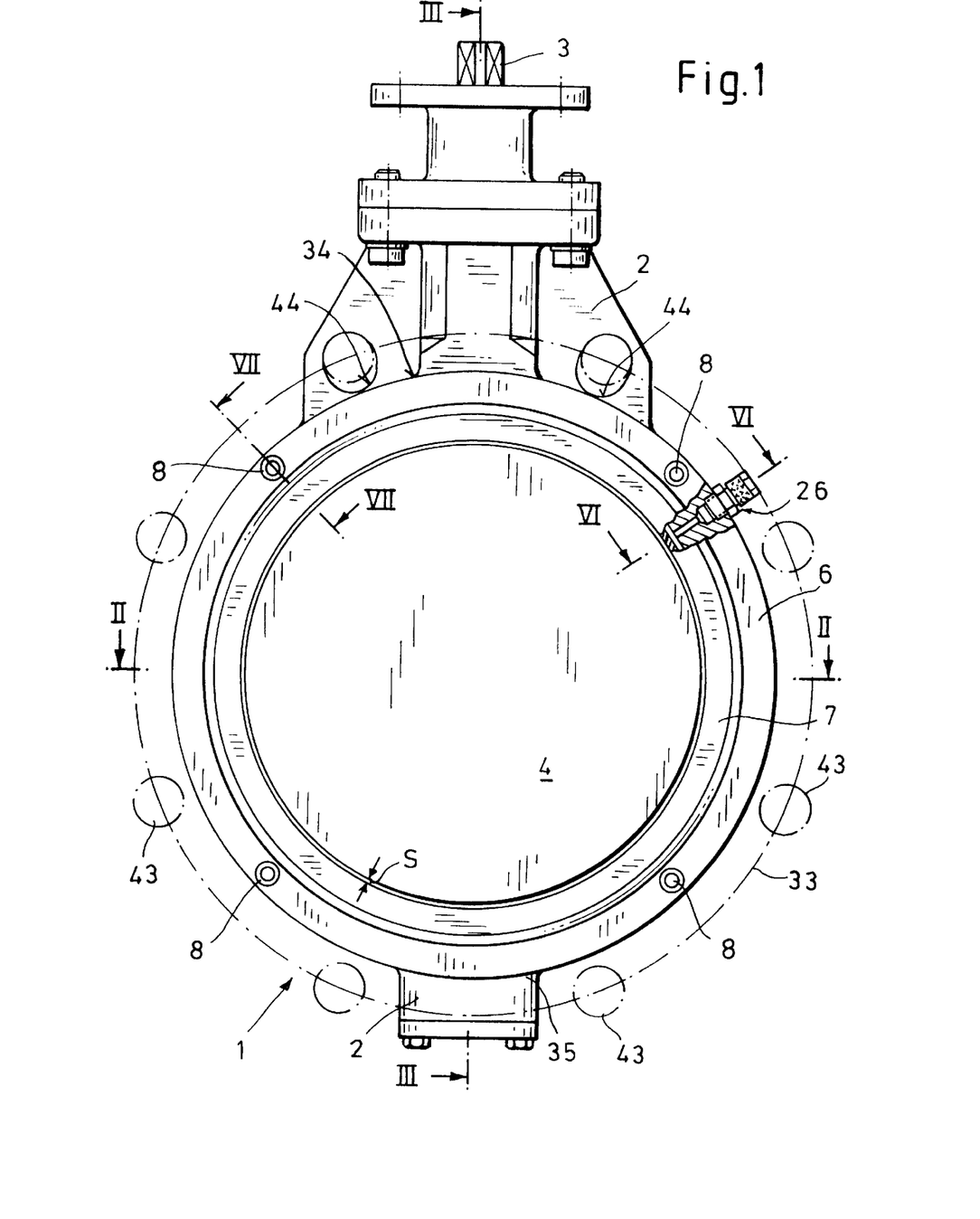
FIG. 1 a view of the shut-off device from the side facing away from the drive shaft of the butterfly valve.
Figure 2:
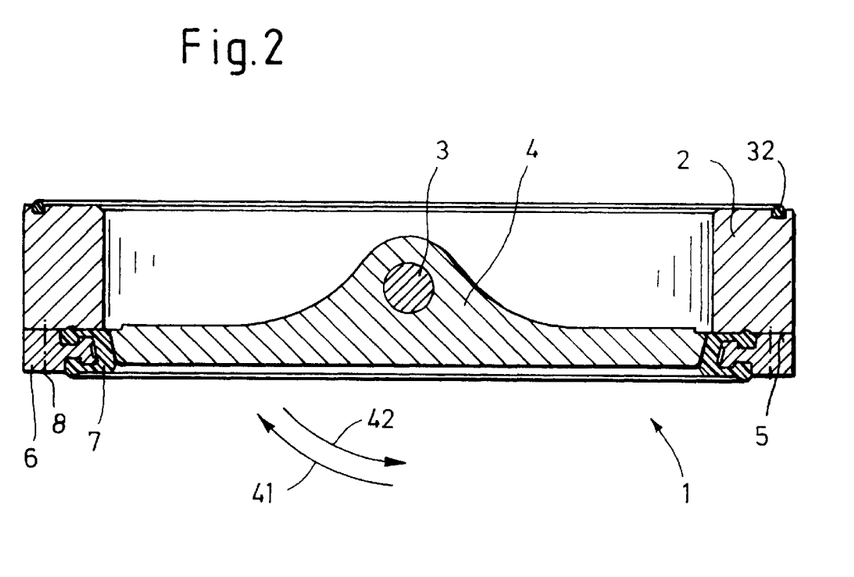
FIG. 2 a section view of the shut-off device along the line II—II in FIG. 1.
Figure 3:
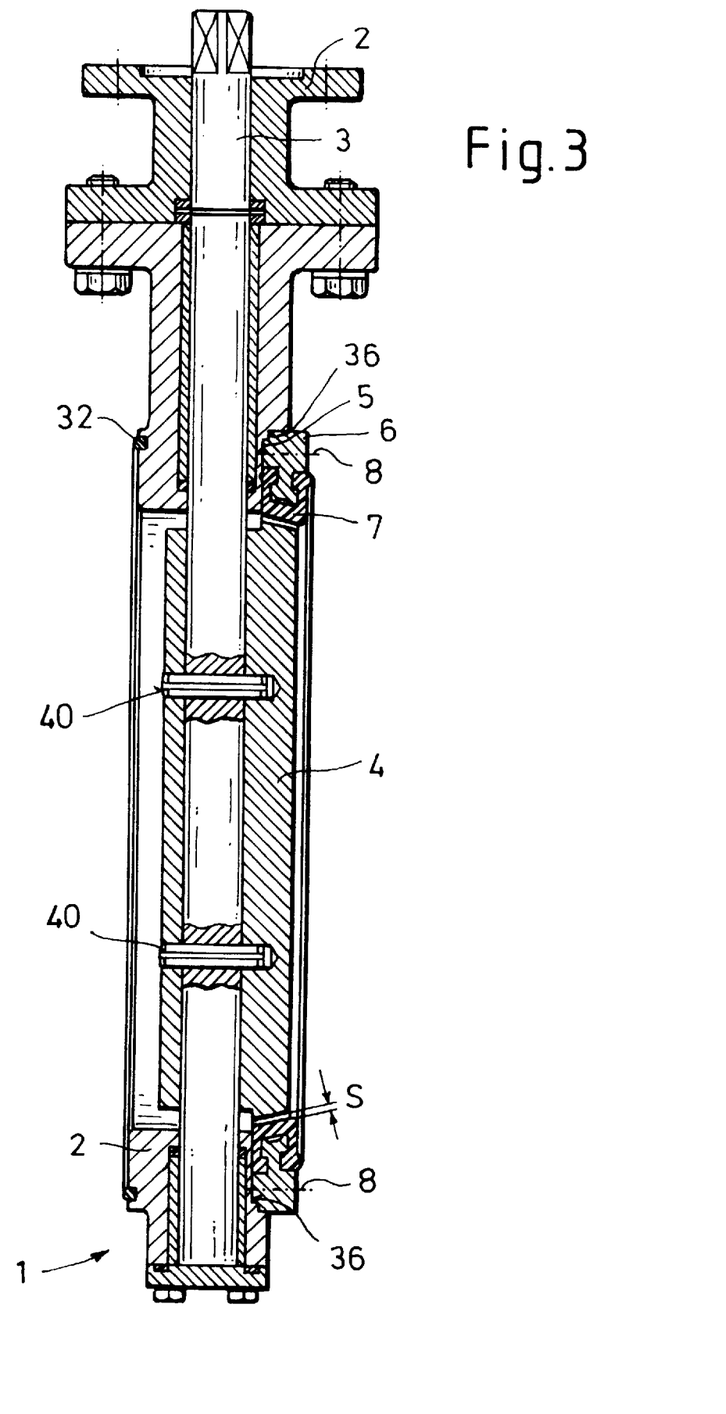
FIG. 3 a section view along the line III—III in FIG. 1 of a first embodiment of a coupling between the drive shaft and the butterfly valve, using dowel pins; with the annular seal not being subjected to pressure.
Figure 3A:
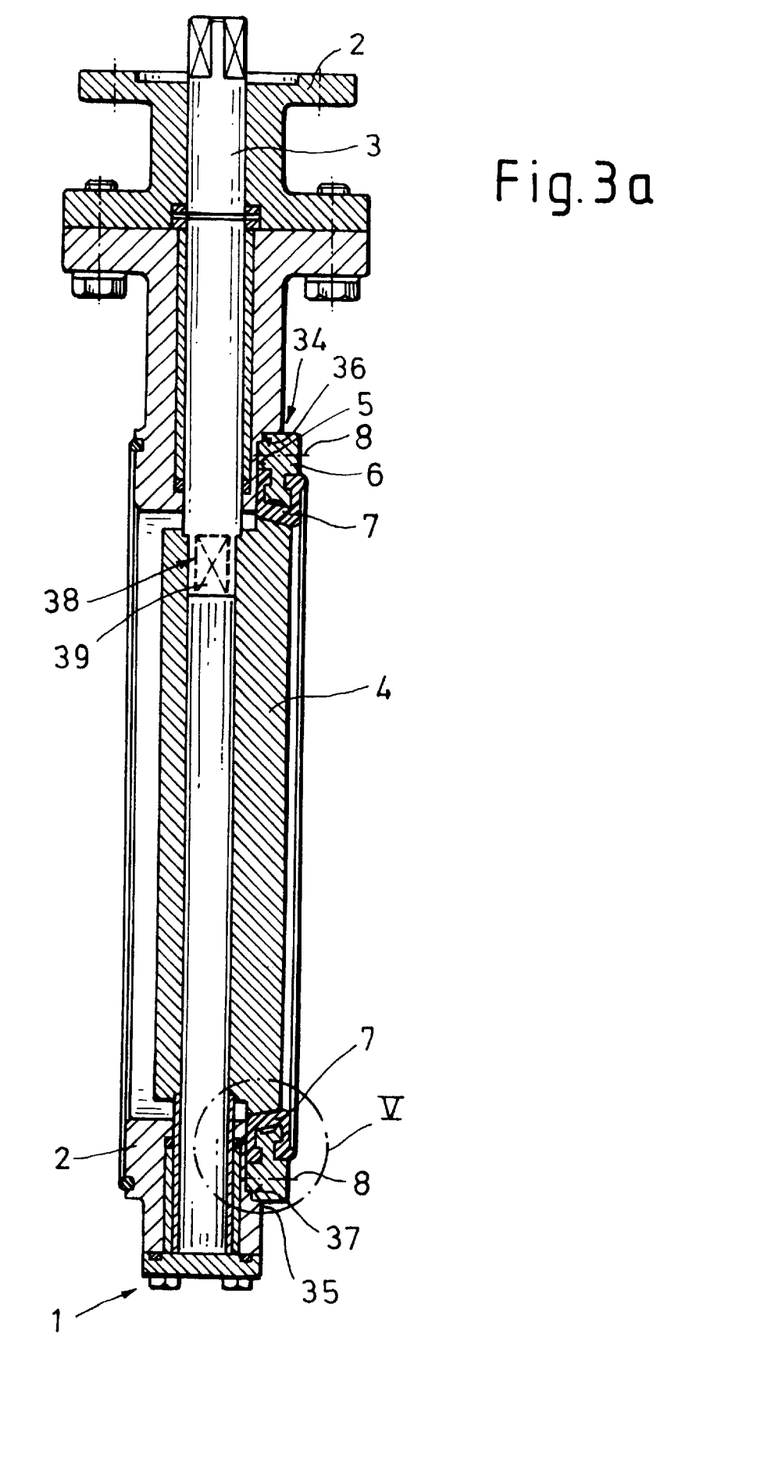
FIG. 3a a section view along the line III—III in FIG. 1 of a second embodiment comprising a plug-in coupling having positive fit, between the drive shaft and the butterfly valve; with the annular seal being subjected to pressure.
Figure 7:
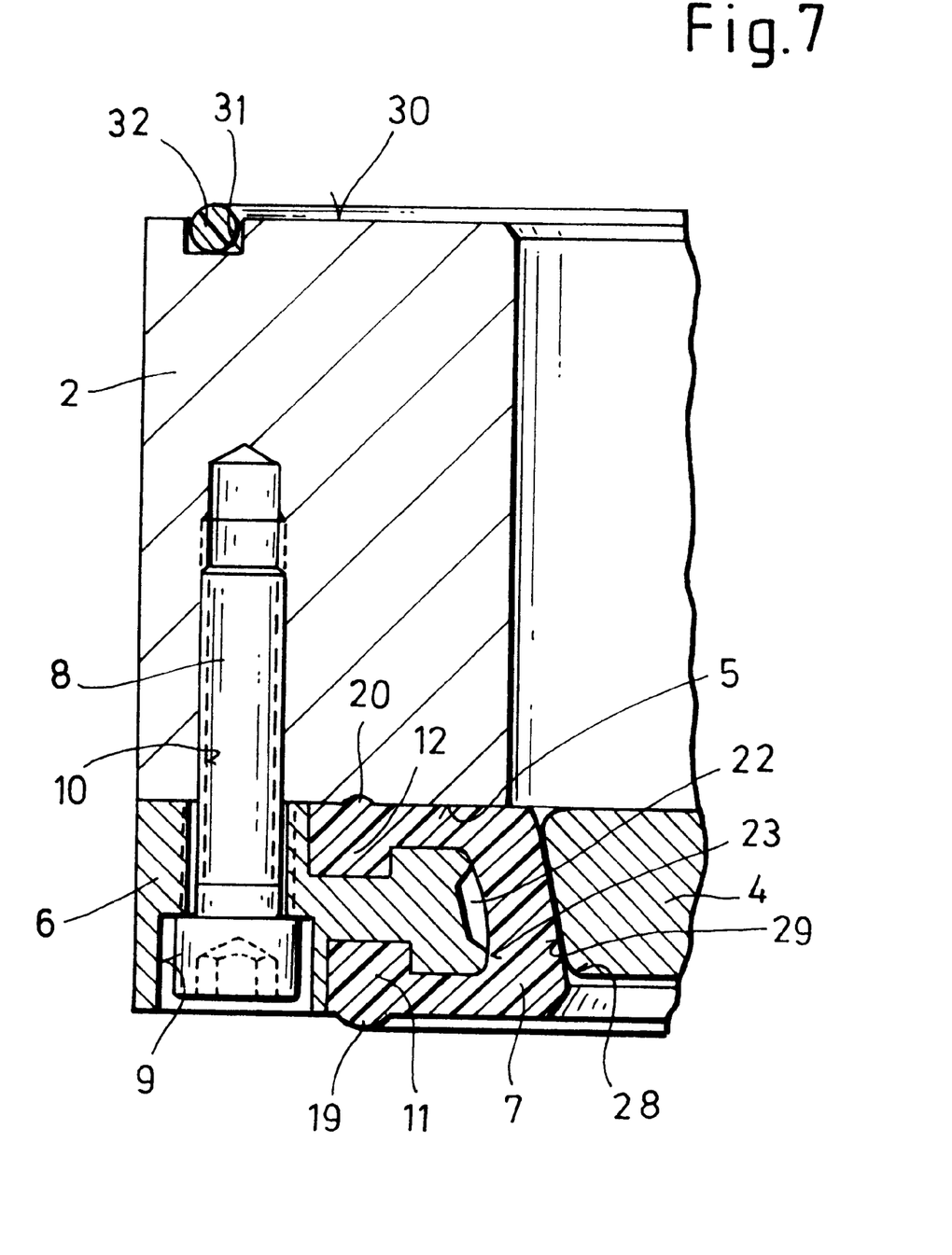
FIG. 7 a section view along the line VII—VII in FIG. 1 through an attachment, established with a conventional hexagon socket screw, of the backup ring to the housing.

The shut-off device 1 according to FIGS. 1 to 4 which is insertable in a pipeline (not shown) essentially comprises a housing 2, and a butterfly valve 4 swivellable by a drive shaft 3, wherein said butterfly valve 4 in its closed position as shown in FIG. 3a is sealed off from the housing 2 by a distensible entropy-elastic annular seal 7 of U-shaped cross section; with fluid able to be applied to said seal 7 which is held by a backup ring 6 on a face 5 of the housing. As shown in FIGS. 1 and 7, the backup ring 6 is attached to the housing 2 with this annular seal 7 by way of conventional hexagon socket screws 8 which in FIGS. 3 and 3a are merely indicated as symmetry axes. For this purpose the backup ring 6 according to FIG. 7 comprises a recess 9 accommodating the head of the hexagon socket screw 8 while the housing 2 comprises a blind hole 10 with an internal thread.

These hexagon socket screws 8 do not require a separate seal in any form whatever.

As shown in FIGS. 2, 3 as well as 5 to 7, according to the invention the annular seal 7 comprises two annular projections 11, 12 facing each other, with said projections 11, 12 engaging an annular groove 13, 14 each, in each face 15, 16 of the backup ring 6, so as to provide a seal.

Figure 5:
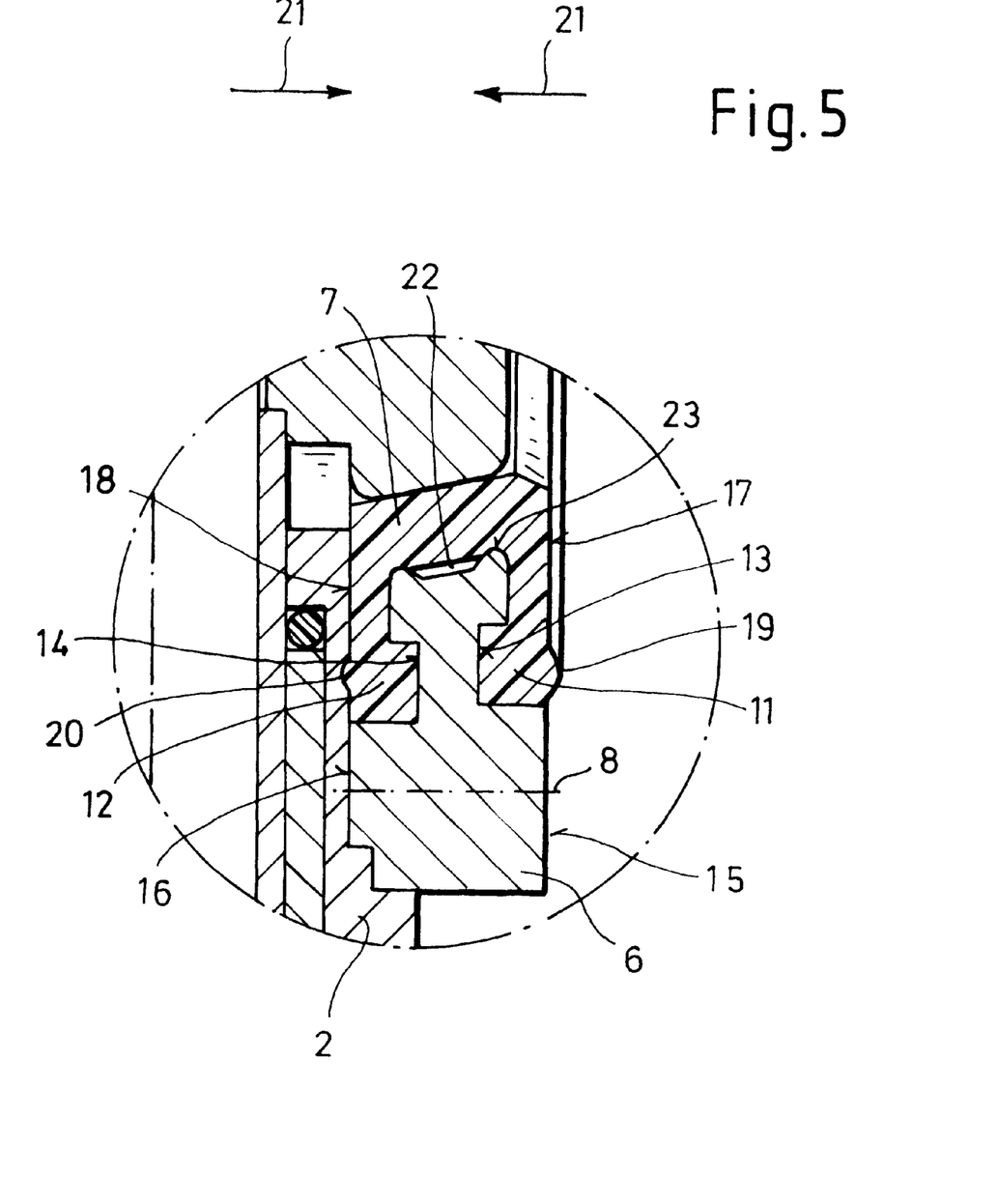

Furthermore, a projecting sealing ring 19, 20 is integrated into each of the lateral external areas 17, 18 of the annular seal 7.

The cross-sectional shape of the facing annular projections 11, 12 of the annular seal 7 matches the cross-sectional shape of the accommodating annular groove 13, 14 so as to provide a positive fit. In the region of these projections 11, 12, on the two lateral external areas 17, 18 of the annular seal 7, the projecting sealing rings 19, 20 are arranged. Since these sealing rings 19, 20 have overmeasure in relation to the two faces 15, 16 of the backup ring 6, the sealing ring 20 is compressed already during tightening of the hexagon socket screws 8 shown in FIG. 7, while the sealing ring 19 is compressed during installation of the shut-off device 1 in a pipeline by means of a flange connection, with compression taking place in the direction of the arrows 21 shown in FIG. 5. As a result of such compression, the facing projections 11, 12 of the annular seal 7 also undergo compression, similar to that of an O-ring, thus closing off the fluid chamber 22 by providing a fluid-proof seal to the faces 15, 16 of the backup ring 6. This solves several problems at once, namely:

a) by way of the sealing rings 19, 20 (whose cross section can be a semicircle or a segment of a circle) integrated in the annular seal 7, the interior of the pipeline (not shown) is sealed off from the external atmosphere;

b) at the same time, compression of the sealing rings 19, 20 also causes compression of the projections 11, 12, thus activating the seal for sealing the fluid chamber 22; and c) if the annular seal 7 is not subjected to pressure, in the case of any repairs, the backup ring 6 and the annular seal 7 can easily be removed from the housing 2, without suction forces of the sealing rings 19, 20 having to be overcome. Either the faulty annular seal 7 can be replaced on the backup ring 6 with a new annular seal 7, or the entire set comprising backup ring 6 and annular seal 7 can be exchanged.

In order to render such an exchange less problematical, the described hexagon socket screws 8 are used, which do not require any seals and which engage the blind holes 10 of the housing 2. Of course, these hexagon socket screws 8 can also be replaced by other screws that can be countersunk in the backup ring 6.

Figure 6:
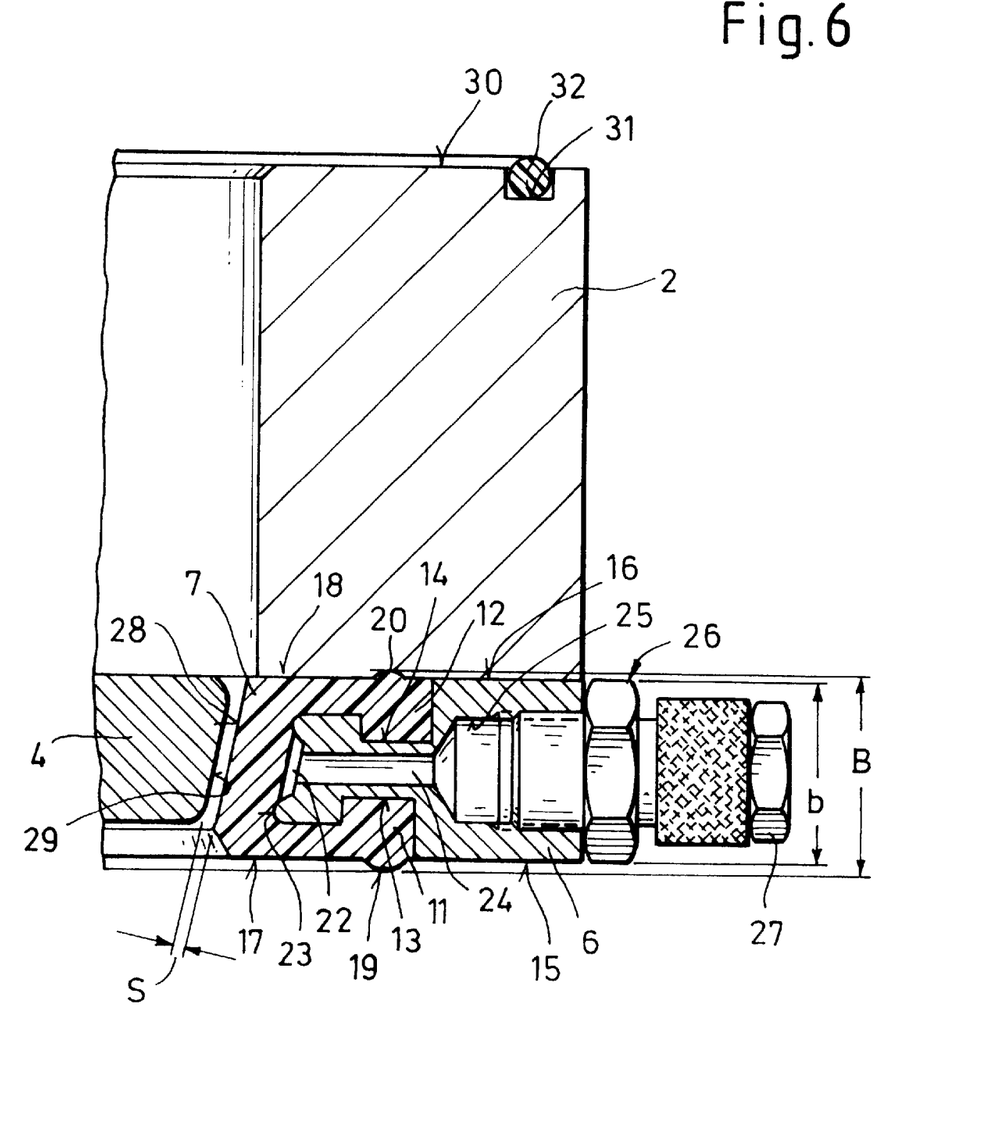
FIG. 6 a section view along the line VI—VI of FIG. 1 through the connection of the pressurised fluid line for distending the annular seal.

As is shown in particular in FIGS. 5 to 7, at its internal circumferential area 23 with the fluid pressure chamber 22, the backup ring 6 has an all-round annular groove, with a fluid connection pipe 24, which is sealed so as to be fluid-proof towards the external atmosphere, directly leading into said annular groove so that pressure can be exerted on the annular seal 7. This fluid connection pipe 24 penetrates the backup ring 6 radially from the outside and at its other end leads into a channel 25 which comprises a sealed-off screw connection 26 for the fluid supply 27. This screw connection 26 with the channel 25 is sealed off from the external atmosphere either by way of a metal ring seal or an adhesive means, for example Loctite. This design obviates the need for additional sealing off of the fluid connection pipe 24 in relation to the housing 2, as is the case with the nearest state of the art according to DE 195 42 568 C2. The total width b of the screw connection 26 for the fluid connection pipe 24 is slightly smaller than the width B of the backup ring 6 with the sealing rings 19, 20 of the annular seal 7 in the compressed state.

As is also shown in FIG. 6, in the non-pressurised state of the entropy-elastic annular seal 7, there is an all-round annular clearance S between the area of the external circumference 28 of said annular seal 7 and the area of the external circumference 29 of the butterfly valve 4. Only when the closed position of the butterfly valve 4 has been reached, as shown in FIG. 7, is the fluid pressure chamber 22 subjected to pressure via the fluid connection pipe 24, and thus the entropy-elastic annular seal 7 is distended. Consequently, its area of the external circumference 28 is pressed against the area of the external circumference 29 of the butterfly valve 4 so that the clearance S disappears, as is shown in FIGS. 2, 3a, 5 and 7. This means that the butterfly valve 4 is swivelled into and out of its closed position without touching the annular seal 7, with said annular seal 7 being distended only after the butterfly valve 4 has reached the sealing position. The pressure is released from the fluid pressure chamber 22 and thus from the annular seal 7, before the butterfly valve 4 is swivelled out of its sealing position.

As is shown in FIGS. 2, 3, 3a as well as 5 to 7, at its face 30 pointing away from the annular seal 7, the housing 2 comprises an O-ring 32 inserted in an annular groove 31, thus sealing off said housing 2 and the pipeline end (not shown) abutting against this face 30. This type of seal is already known from the state of the art.

As is shown most clearly in FIG. 2 in conjunction with FIG. 1, as well as in FIGS. 3 and 3a, for installation, the backup ring 6 is placed onto the matching face 35 of the housing 2 until it is encompassed by centring set-offs 36, 37 only in the two diametrically opposed regions 34, 35 of the through-guides of the drive shaft 3. In this way not only the installation but also the production of the shut-off device 1 is considerably simplified compared to the state of the art.

FIGS. 3 and 3a show two different connections between the drive shaft 3 and the butterfly valve 4:

In FIG. 3 the drive shaft 3 is coupled to the butterfly valve 4 by means of two dowel pins 40. This embodiment provides the advantage of a through-shaft 3 of the same diameter and thus of simple production and design.

The connection shown in FIG. 3a comprises a journal coupling 38 having a positive fit, said journal coupling 38 essentially comprising a multi-edge coupling journal 39 and an acceptance aperture (not shown) having a positive fit, in the butterfly valve 4.

The drive shafts 3 shown in FIGS. 3 and 3a have bearing arrangements involving bearing bushes and seals in the housing 2, as is known from the state of the art. Since such bearing arrangements and the associated sealing arrangements do not touch upon the object of the invention, no further description thereof is provided.

To open the butterfly valve 4 and thus to open the passage to the flow of fluid to be conveyed, the butterfly valve 4 is swivelled on the drive shaft 3, in the direction of arrow 41 in FIG. 2. However, such swivelling movement only occurs when the fluid pressure chamber 22 is no longer under pressure and when the annular seal 7 is thus depressurised. In this situation there is an annular clearance S, shown in FIGS. 3 and 6, between the area of the external circumference 28 of the annular seal 7 and the area of the external circumference 29 of the butterfly valve 4. The butterfly valve 4 can thus be swivelled out of its closed position without touching any components.

In order to shut the passage off to the flow of fluid, the butterfly valve 4 is swivelled back in the direction of the arrow 42, as shown in position 2. When said butterfly valve 4 has reached this closed position, pressure is applied to the fluid pressure chamber 22 via the fluid connection pipe 24, the annular seal 7 is distended and thus the area of the external circumference 28 of the annular seal 7 is pressed against the area of the external circumference 29 of the butterfly valve 4, as is shown in FIGS. 5 and 7 which each provide an enlarged view. In this position the clearance S is zero and thus the flow of fluid is closed off.

Since the swivelling out movement of the butterfly valve 4 into its open position, as indicated by arrow 41, and the swivelling in movement of the butterfly valve 4 into its closed position, as indicated by arrow 42, both take place without touching the annular seal 7, said annular seal 7 is subjected to less friction and consequently its service life is improved.

Figure 4:
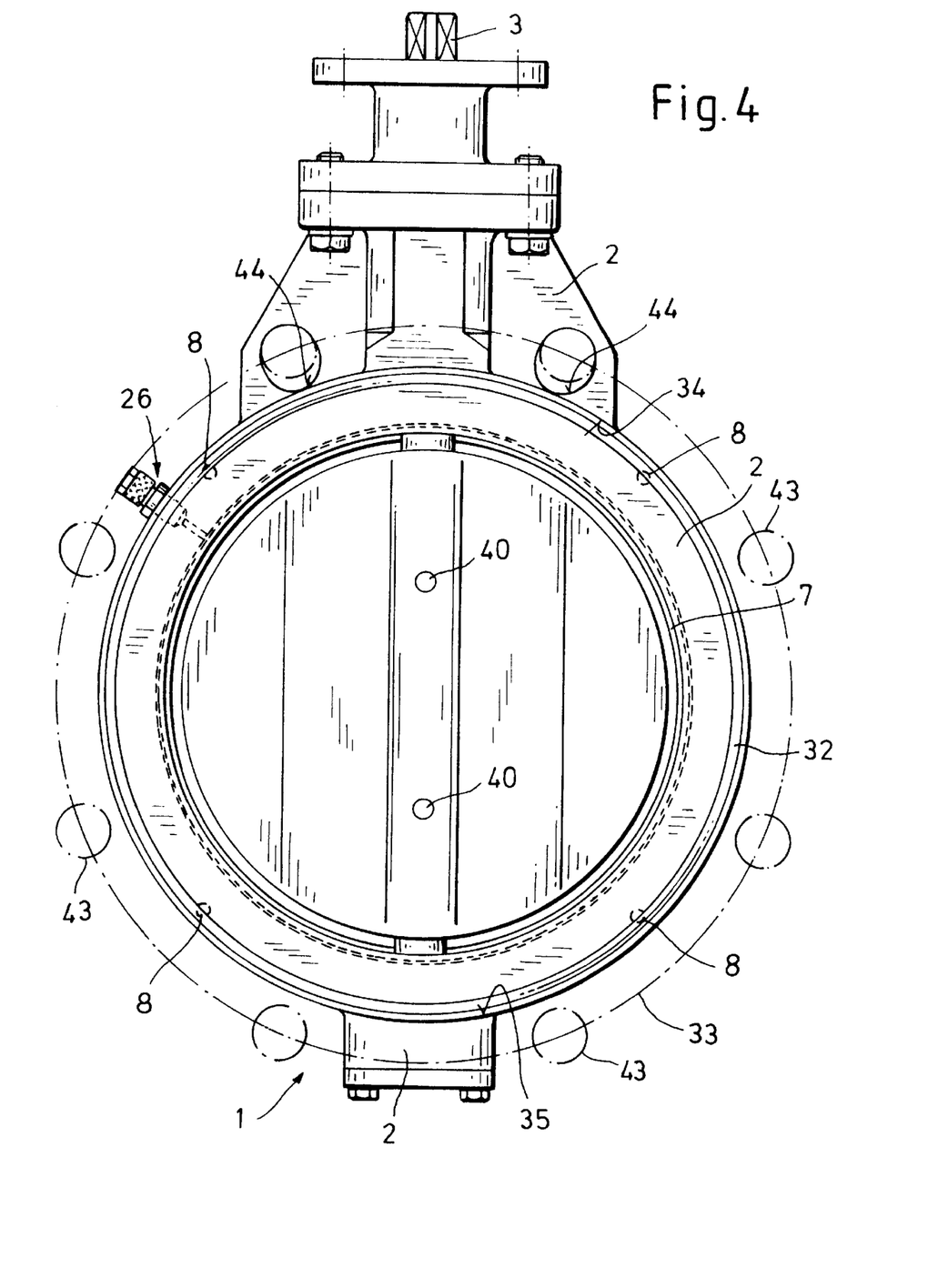
FIG. 4 a rear view of the shut-off device shown in FIG. 1.

In FIGS. 4, 1 and 3, corresponding parts appear with the same reference numbers. In the embodiment shown in FIG. 3, the butterfly valve 4 with the drive shaft 3 is coupled by way of the dowel pins 40.

Furthermore, in FIGS. 1 and 4 graduated circles 33 with drill holes 43 indicate the ends of pipelines (not shown) with flange connections, shown by a dot-dash line, between which ends of pipelines the shut-off device 1 is inserted and fastened with flange screws which pass through the drill holes 43. The drill holes 43 for the flange screws are arranged, evenly spaced apart, on the graduated circle 33 so even tightening can be achieved. The flange screws in the upper region 34 of the housing 2 can pass through the housing 2 with play because their apertures 44 are oval.

List of references:

| | |
|---|---|
| Shut-off device | 1 |
| Housing | 2 |
| Drive shaft | 3 |
| Butterfly valve | 4 |
| Face of the housing 2 | 5, 30 |
| Backup ring | 6 |
| Annular seal | 7 |
| Hexagon socket screw | 8 |
| Recess | 9 |
| Blind hole | 10 |
| Projections on the annular seal 7 | 11, 12 |
| Annular grooves in the backup ring 6 | 13, 14 |
| Faces of the backup ring 6 | 15, 16 |
| Lateral external area of the annular seal 7 | 17, 18 |
| Sealing rings | 19, 20 |
| Arrows | 21, 41, 42 |
| Fluid pressure chamber | 22 |
| Internal circumferential area of the backup ring 6 | 23 |
| Fluid connection pipe | 24 |
| Channel | 25 |
| Screw connection | 26 |
| Fluid supply | 27 |
| Area of the external circumference of the annular seal 7 | 28 |
| Area of the external circumference of the butterfly valve 4 | 29 |
| Annular groove in the housing 2 | 31 |
| O-ring | 32 |
| Graduated circle | 33 |
| Diametrically opposed regions | 34, 35 |
| Turned grooves | 36, 37 |
| Journal coupling | 38 |
| Coupling journal | 39 |
| Dowel pins | 40 |
| Drill holes | 43 |
| Apertures in the housing 2 | 44 |
| Overall width of the screw connection 26 | b |
| Width of the backup ring 6 | B |
| Annular clearance | S |

What is claimed is:

1. A shut-off device comprising a single-part housing insertable in a pipeline, and a butterfly valve swivellable by an eccentrically pivoted drive shaft wherein said butterfly valve in its closed position is sealed off from the housing and from the pipe connection, by a distensible entropy-elastic annular seal of U-shaped cross section to which fluid can be applied, with said annular seal being held by a backup ring on a face of the housing by several screws, characterised in that by means of two annular projections (11, 12) which face each other, the annular seal (7) engages one annular groove (13, 14) each in each face (15, 16) of the backup ring (6) so as to provide a seal; in that each of the lateral external areas (17, 18) of said annular seal (7) comprises an integrated projecting sealing ring (19, 20), in that an annular groove is formed around the internal circumferential area of the backup ring (6), said annular groove providing for the formation of a fluid pressure chamber (22) when said backup ring (6) and said annular seal (7) are assembled, in that a fluid connection pipe (24) penetrates said backup ring (6), and directly leads to said annular groove, said fluid connection pipe (24) sealed off from the external atmosphere, thereby allowing said fluid pressure chamber (22) to be pressurized to exert pressure on said annular seal (7), and in that said several screws are conventional socket screws.

2. The shut-off device according to claim 1, characterised in that the cross-sectional shape of the facing annular projections (11, 12) of the annular seal (7) matches the cross-sectional shape of the accommodating annular groove (13, 14) so as to provide a positive fit, and with the projecting sealing rings (19, 20) being arranged in the region of these projections (11, 12), on the two lateral external areas (17, 18) of the annular seal (7).

3. The shut-off device according to claim 1, characterised in that the sealing rings (19, 20) integrated in each of the lateral external areas (17, 18) comprise a cross section which is in the shape of a semicircle or a segment of a circle.

4. The shut-off device according to claim 1, characterised in that the backup ring (6) is placed onto the matching face (33) of the housing (2) and encompassed by centring turned grooves (36, 37) only in the two diametrically opposed regions (34, 35) of the lead-through of the shaft (3) of the butterfly valve (4).

5. The shut-off device according to claim 1, characterised in that the butterfly valve (4) is swivellable into and out of its closed position without touching the annular seal (7), and in that said annular seal (7) is distended only after the butterfly valve (4) has reached its closed position and is depressurised before the butterfly valve (4) is swivelled out of its closed position.

6. A shut-off device according to claim 5, characterised in that in the non-pressurised state of the entropy-elastic annular seal (7), there is an all-round annular clearance (S) between the area of the external circumference (28) of said annular seal (7) and the area of the external circumference (29) of the butterfly valve (4).

7. A shut-off device according to claim 1, characterised in that at its face (30) pointing away from the annular seal (7), the housing (2) comprises an O-ring (32) inserted in an annular groove (31), thus sealing off said housing (2) and the pipeline end abutting against this face (30) in a way which is known per se.

* * * * *